United States Patent [19]
Harrison et al.

[11] Patent Number: 5,977,909
[45] Date of Patent: *Nov. 2, 1999

[54] METHOD AND APPARATUS FOR LOCATING AN OBJECT USING REDUCED NUMBER OF GPS SATELLITE SIGNALS OR WITH IMPROVED ACCURACY

[75] Inventors: Daniel David Harrison, Delanson; Glen William Brooksby, Glenville, both of N.Y.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/040,201

[22] Filed: Mar. 13, 1998

[51] Int. Cl.$^6$ .............................. H04B 7/185; G01S 5/02
[52] U.S. Cl. ............................. 342/357.09; 342/357.13; 701/213
[58] Field of Search .............................. 342/357, 357.06, 342/357.09, 357.13; 701/213, 215

[56] References Cited

U.S. PATENT DOCUMENTS

| | | |
|---|---|---|
| 5,129,605 | 7/1992 | Burns et al. . |
| 5,682,139 | 10/1997 | Pradeep et al. .......................... 340/539 |
| 5,752,218 | 5/1998 | Harrison et al. ......................... 701/207 |
| 5,828,979 | 10/1998 | Polivka et al. ........................... 701/117 |

*Primary Examiner*—Theodore M. Blum
*Attorney, Agent, or Firm*—Marvin Snyder; Douglas E. Stoner

[57] ABSTRACT

The number of simultaneous equations needed to find the location solution of an asset being tracked, such as a railcar, or, in the alternative, to improve the localization accuracy of any of several positioning methods used to track assets, is reduced by using a railway track database. Known railway track locations are used to constrain the railcar (i.e., asset) location solutions. This constraint makes the Cartesian coordinate location x, y and z values interdependent and reduces the number of simultaneous equations needed to find the location solution. Since all relevant railcars must be supported on railway tracks, and railway track locations and elevations throughout North America are available in a database, the number of satellite signals required is reduced. The railway track database represents a complex set of railway tracks. Instead of forming the complete set of function factors that make up the railway track data base every time a railcar location solution is needed, a start is made from a previous solution and only those railway tracks and/or branches that are feasible (i.e., nearby) are tried. Thus, the complexity of forming all railway track function terms is reduced to forming only those needed in a short railway track "tree search".

27 Claims, 7 Drawing Sheets

METHOD AND APPARATUS FOR LOCATING AN OBJECT USING REDUCED NUMBER OF GPS SATELLITE SIGNALS OR WITH IMPROVED ACCURACY

CROSS-REFERENCE TO RELATED APPLICATION

This application discloses subject matter related to that of copending applications Ser. No. 08/456,229 filed on May 31, 1995, by Daniel D. Harrison, Anantha K. Pradeep, Glen W. Brooksby and Stephen M. Hladik for "A Reduced-Power GPS-Based System for Tracking Multiple Objects from a Central Location", assigned to the assignee of this application. The disclosure of application Ser. No. 08/456,229 is incorporated herein by reference.

BACKGROUND OF THE INVENTION

1. Field of the Invention

This invention generally relates to Global Positioning System (GPS) asset localization and, more particularly, to a method of minimizing the number of GPS satellite signals needed or to improve accuracy in GPS-based asset localization.

2. Background Description

The tracking and location of assets such as railcars, shipping or cargo container, trucks, truck trailers, automobiles, etc. can be highly advantageous in commerce. Precise tracking of such vehicles and objects can facilitate their being allocated and positioned in an efficient manner, and can provide for immediate, accurate localization of lost, delayed or damaged assets. The space-based global positioning system (GPS) implemented by the United States Department of Defense constitutes a convenient instrumentality for determining geographical position in real time.

The GPS is a multiple satellite-based radio positioning system in which each satellite transmits data that allows precise measurement of the distance from selected ones of the GPS satellites to the antenna of a user's receiver so as to enable the user to compute position, velocity and time parameters through known triangulation techniques. The signals provided by the GPS can be received both globally and continuously.

The GPS comprises three major segments known as space, control and user segments. The space segment consists of twenty-one operational satellites and three spare satellites. The satellites are positioned in a constellation such that typically seven satellites, but a minimum of four, are observable by a user anywhere on or near the earth's surface. Each satellite transmits L-band signals on two frequencies known as L1 (1575.42 MHZ) and L2 (1227.6 MHZ), using spread spectrum techniques that employ two types of spreading functions.

C/A (or coarse/acquisition code) and P (or precise) pseudo random noise (PRN) codes are transmitted on frequency L1, and P code only is transmitted on frequency L2. Both P and C/A codes contain data that enable a receiver to determine the range between a satellite and the user.

Superimposed on both the P and C/A codes is a navigation (NAV) message. A NAV message contains the GPS signal transmission time, a handover word used in connection with the transition from C/A to P code tracking, ephemeris (position) data for the given satellite, and almanac data for all of the satellites in the constellation, including information regarding satellite health, coefficients for the ionospheric delay model for C/A code users, and coefficients used to calculate universal coordinated time (UCT).

The control segment comprises a master control station (MCS) and a number of monitor stations. The monitor stations passively track all GPS satellites in view, collecting ranging data and satellite clock data from each satellite. This information is passed on to the MCS where the satellite's future ephemeris and clock drift are predicted. Updated ephemeris and clock data are uploaded to each satellite for retransmission in each satellite's navigation message. The purpose of the control segment is to ensure that the information transmitted from the satellites is as accurate as possible.

The GPS is useful in a wide variety of applications, including space, air, sea and land vehicle navigation, precise positioning, time transfer, altitude referencing and surveying. A typical GPS receiver comprises several subsystems, including an antenna assembly, an RF (radio frequency) assembly, and a GPS processor assembly. The antenna assembly receives the L-band GPS signal and amplifies it prior to insertion into the RF assembly. The RF assembly mixes the L-band GPS signal down to a convenient IF (intermediate frequency) signal. This signal is then fed to the GPS processor assembly in which the PRN code modulating the L-band signal is tracked through code-correlation at the receiver. This provides the processing gain needed to achieve a signal-to-noise ratio (SNR) sufficient for demodulating the navigation data and signal-transmission time stamp. The Doppler shift of the received L-band signal is also measured through a carrier tracking loop. The code correlation and carrier tracking function can be performed using either analog or digital signal processing.

A GPS receiver can determine its location by processing signals received from several of the GPS satellites so as to determine the satellite positions and range from the receiver to each of the satellites. With perfect knowledge of the range to just three satellites, exact receiver position can be determined as the intersection of the three spheres induced by the known satellite positions and the derived receiver ranges. The range to a particular satellite is calculated as the propagation time multiplied by the speed of light. The propagation time is found by recognizing a predetermined transmitted marker in the received signal and noting its reception time, reading the transmission time associated with the marker from the NAV data stream, and calculating propagation time as the difference between the reception and transmission times. The reception time is found by performing a cross-correlation of the received signal with a local replica of the known satellite Gold code, and noting the reception time of a chosen correlation peak. The satellite signal structures use Code Division Multiple Access (CDMA) coding so that the above cross correlation is part of the standard GPS receiver processing.

One type of known GPS receiver is described in U.S. Pat. No. 4,114,155, wherein the position of the receiver responsive to C/A signals derived from multiple, orbiting satellites is determined to an accuracy better than 100 meters. Each of the C/A signals has the same transmitted carrier frequency and a different, predetermined Gold code sequence. C/A signals transmitted to the receiver are separately detected by cross-correlating received Gold code sequences with plural locally derived Gold code sequences. Four of the detected C/A signals are combined to compute receiver position. To determine receiver position to an accuracy typically better than 100 meters, the cross correlation is repeated while the relative phase of the locally derived Gold code sequences is varied over the interval of one chip (i.e., pulse) of each sequence. This provides for sub-chip accuracy in the signal timing.

In operation, a typical GPS receiver performs the following for each of at least four satellite signals:

1) acquires the GPS signal, (detects the signal and learns its code, code-time offset, and Doppler shift),
2) synchronizes with the NAV data stream and reads the satellite transmission time-stamp, clock-correction, ionospheric-delay and ephemeris data,
3) calculates the satellite position from the ephemeris data,
4) reads its own receiver clock to determine the receiver time associated with the reception of the time-stamp epoch, and
5) estimates the signal travel time by subtracting the time-stamp value from the associated receiver time. This time difference is multiplied by the speed of light to obtain an estimated range to the satellite.

Any error in satellite and receiver clock synchronization leads to proportional range errors. Because the same clock is used in receiving all satellite signals, there is only one unknown receiver clock "bias" or error to be found. By receiving and processing a fourth satellite signal, four measurement equations are generated and these are used to jointly solve for the clock bias and the three receiver position coordinates. Error induced by receiver noise is reduced by (effectively) averaging over several range calculations.

A preferred application of the present invention is the locating and tracking of assets such as rail cars, shipping or cargo containers, trucks, truck trailers, and the like, using the GPS. In such application, the GPS receiver is usually battery powered since an independent source of power is generally not available. It is advantageous to increase the operating life of the battery by reducing the energy consumed by the GPS receiver.

In one system of the invention, a central facility or station must track multiple railcars. Each tracked railcar carries a GPS receiver that processes data from several of the visible GPS satellites; however, an accurate position determination is not made at the receiver. Instead, only partial processing is performed at the receiver and intermediate results are transmitted from the railcar to the central station. These intermediate results do not require decoding of navigational or other data from the GPS signals. This system thus allows the GPS receiver and signal processor to be powered only long enough to acquire the GPS satellite signals. With this system, a dominant energy consumer is the GPS signal acquisition process, and the GPS receiver energy used at each tracked railcar will be reduced if the number of GPS satellite signals needed is reduced.

The above referenced application Ser. No. 08/456,229 discloses two methods of centralized object tracking that do not require demodulation of the received GPS signals NAV data. These methods thus allow the GPS receiver and signal processor to be powered only long enough to acquire the GPS satellite signals. In the first method, five GPS satellite signals must be received. The code or bit phases are measured for each signal and sent to the central station along with their associated satellite identification numbers. From these measurements, the asset location is determined at the central station. In the alternative second method, only four GPS satellite signals must be received. The reception time and the code or bit phases are measured for each signal and sent to the central station along with their associated satellite numbers. From these measurements, the asset location is determined at the central station.

It is advantageous to further reduce the number of GPS satellite signals that must be received by a tracked asset such as a railcar. Railcars are frequently in positions where trees, buildings, and the like block reception of some GPS signals so that fewer than the normally required four or more GPS satellite signals are receivable. In such cases, it would be advantageous for the central station to be able to determine railcar location from the limited number of GPS signal measurements. Furthermore, in the above referenced centralized tracking system, the acquisition consumption of energy (and other costs) associated with transmitting the measurements to the central station will be reduced at the tracked railcar if the number of GPS measurements needed is reduced.

SUMMARY OF THE INVENTION

The present invention constitutes a method and system for reducing the number of simultaneous equations needed to find the location solution of an asset being tracked. This method and system serves to improve the localization accuracy of any of several positioning methods used to track assets.

In accordance with the invention, known railway track locations are used to constrain the railcar (i.e., asset) location solutions, preferably in a Cartesian coordinate system defined by x, y, z values. This constraint makes the location x, y and z values interdependent and reduces the number of simultaneous equations needed to find the location solution. For example, the first positioning method from application Ser. No. 08/456,229 cited above uses four simultaneous equations (with arrival time differences between five satellite signals) to jointly determine position, x, y and z, and the time, t. However, all relevant railcars must reside on railcar tracks, and track locations and elevations throughout North America are available in a data base. This position data base can be converted to the from $$f(x,y,z)=0, \tag{1}$$

and equation (1) can then be used in conjunction with only three arrival time difference equations to determine the railcar position and time. Three arrival time differences require four satellite signals, as discussed in application Ser. No. 08/456,229. Thus, the number of satellite signals is reduced from five to four by using the track position database and the first positioning method described in application Ser. No. 08/456,229. Similarly, the required number of satellite signals can be reduced from four to three by using the track position database with the second positioning method described in application Ser. No. 08/456,229.

DETAILED DESCRIPTION OF A PREFERRED EMBODIMENT OF THE INVENTION

Figure 1:
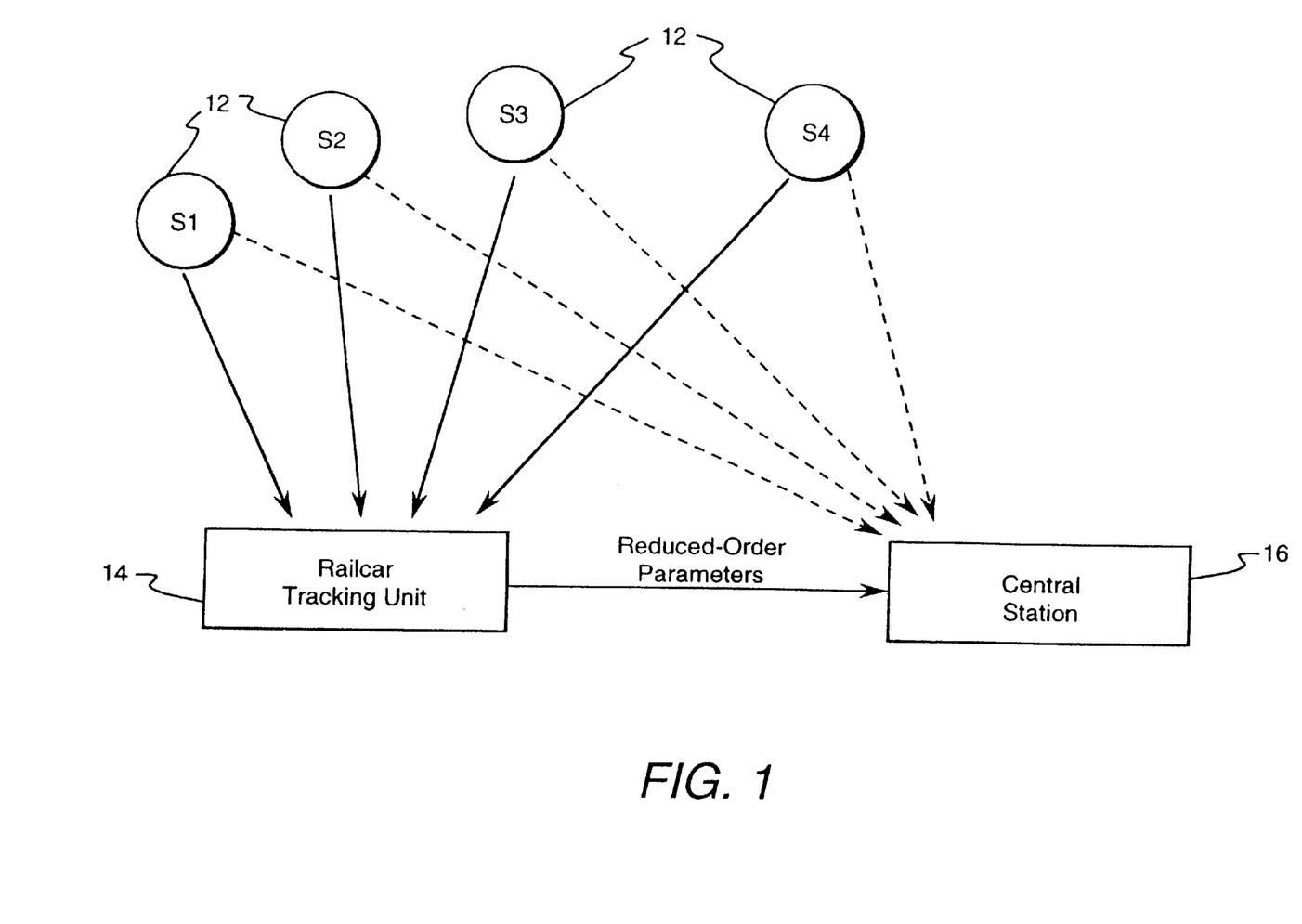
FIG. 1 is a block diagram of a remote tracking system in accordance with the present invention.

FIG. 1 illustrates a plurality of GPS satellites 12, a tracking unit 14 carried by an object being tracked (asset), such as a railcar (not shown), and a central station 16. As described earlier, each satellite 12 transmits a signal that a GPS receiver (not shown) in tracking unit 14 uses to measure propagation delay (and delay rate, if asset velocity is desired) from that satellite to the receiver antenna. The satellite signals also include the periodically repeating NAV data that is needed to determine a navigation solution from the measured time delays. Because of the low chip rate (50 bits per second) of the NAV data in the GPS signal, a receiver must be active for a substantial period of time (approximately one minute) if the NAV data is to be collected. Furthermore, NAV data for any particular satellite changes over time and the GPS MCS monitors these changes and provides nearly hourly updates to the NAV data. To insure accurate navigation solutions, any GPS based navigation system must use NAV data that is no more than about four hours old. If the asset positions are to be monitored more frequently than every four hours, then new NAV data must be collected at least every four hours. NAV data maintenance then requires an approximate average of fifteen seconds of receiver operation per hour and, for a plurality of tracked assets, this entails a significant energy expense if done at each tracked asset.

With one form of the present invention, the navigation solution is not calculated at the asset but is instead calculated at the central station. None of the NAV data is needed at the tracked asset. At the asset, only data relating to the GPS signal propagation delay between each satellite and the asset need be measured, and this data is then sent to the central station. The NAV data can be determined at central station 16 by utilizing a standard GPS receiver there, or by communicating with a standard GPS receiver appropriately located apart from the tracked asset. In another form of the invention, the NAV data, or the navigation solutions are communicated to the assets being tracked via, for example, a higher rate communication link that requires less energy to be received at the asset. In either case, there is no NAV data decoding needed at the asset so that GPS signal acquisition becomes the main GPS processing task at the asset. Energy use at the asset is then nearly proportional to the number of GPS satellite signals that must be acquired. Feasibility of the centralized tracking system is enhanced by reducing the asset energy requirement.

Figure 2:
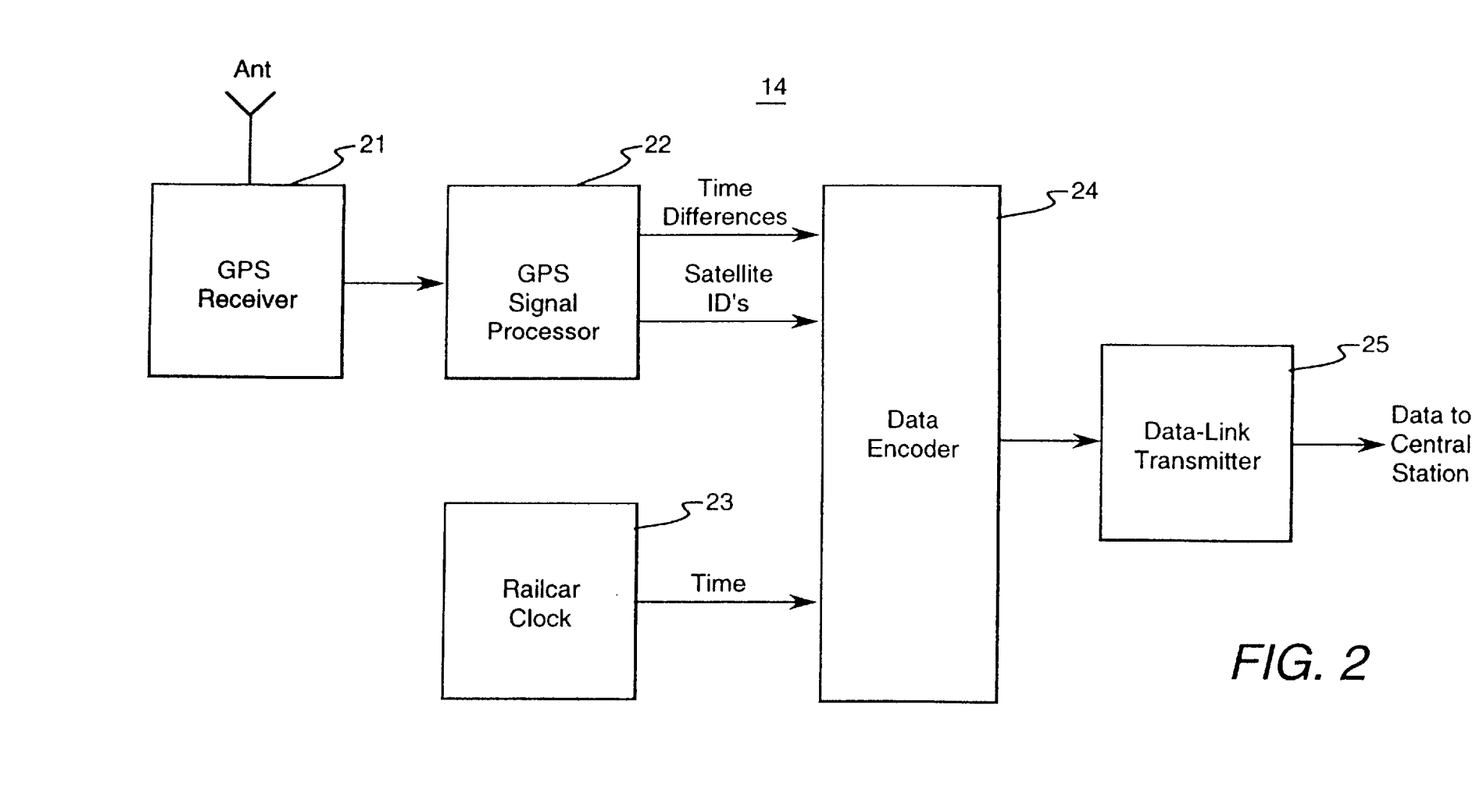
FIG. 2 is a block diagram of a tracking unit on an object to be tracked in accordance with the invention.

As shown in FIG. 2, a railcar tracking unit 14 is actually comprised of a receiver 21 responsive to the signals from GPS satellites 12 (FIG. 1), a GPS signal processor 22, a railcar clock 23, a data encoder 24, and a transmitter 25. The received signals are processed in processor 22 to ascertain and utilize propagation time differences among the signals received from the GPS satellites. By utilizing time differences, the need for knowledge of the GPS signal transmission time-stamps at the asset is alleviated, and NAV data stream decoding is therefore unnecessary at the asset. With no need for GPS data stream decoding, the receiver process reduces to acquisition of the GPS signals and calculating the relevant time differences (and Doppler frequency differences, if asset velocities are to be determined) from the acquisition results. The measured time differences, data identifying the associated GPS satellites, and (for the case where only four satellite signals are measured) the receiver time associated with time-difference measurements are encoded by data encoder 24 for transmission by transmitter 4 to central station 16 (FIG. 1). A description of the centralized tracking system in which GPS signal acquisition is a major part of the assets' GPS energy budget is found in co-pending application Ser. No. 08/456,229, referenced above.

Figure 3:
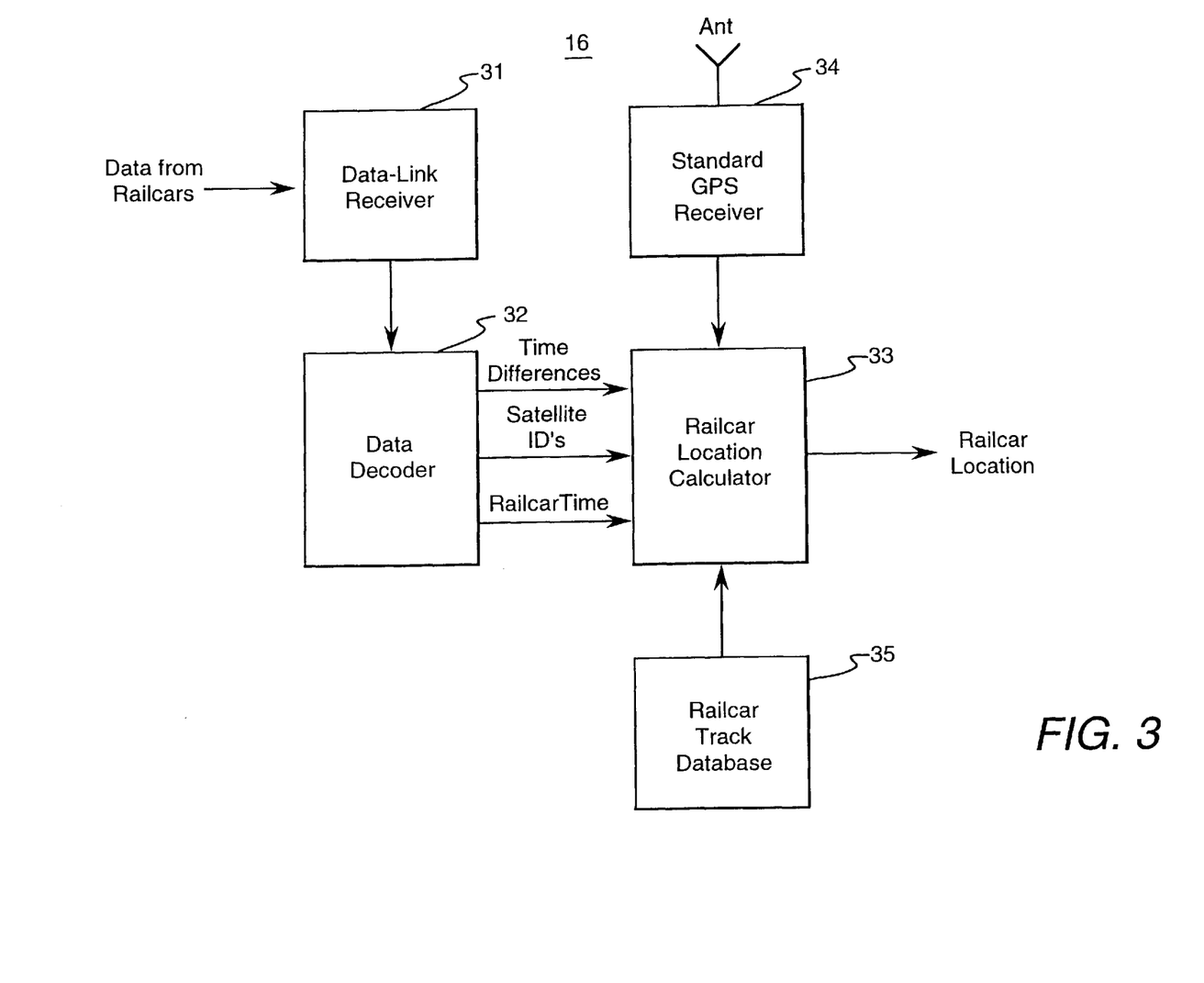
FIG. 3 is block diagram of the central station for a centralized tracking system in accordance with the invention.

FIG. 3 illustrates a central station for a centralized tracking system that uses fewer than the normally needed four or more GPS signals to determine railcar position. Data from railcars is received by a receiver 31 and supplied to a data decoder 32 which supplies time differences, satellite identifications (IDs), and railcar time to a railcar location calculator 33. Railcar location calculator 33 also receives the output signal of a standard GPS receiver 34 and accesses track location data from a railcar track database 35. Railcar location calculator 33 utilizes the track location information from database 35 in combination with the GPS signal data received from a railcar tracking unit to determine the railcar location. Alternatively, the track location information from database 35 can be used at the central station to improve the accuracy of the calculated railcar location even when the normally required number of GPS signals are received and processed at the railcar.

In one aspect of the invention, the known railway track locations in track database 35 at the central station are used with signal arrival time measurements from a plurality of GPS satellites at the railcar to constrain the railcar location solutions. This track database constraint makes the railcar location x, y, and z values interdependent (instead of independent) and reduces the number of GPS signal measurements needed to find the location solution. For example, the first positioning method described in co-pending application Ser. No. 08/456,299 uses three simultaneous equations (with arrival time measurements from four satellite signals) to jointly determine railcar x, y, and z location components. However all relevant railcars must reside on railway tracks, and railway track locations and elevations throughout North America are commercially available in a database.

Figure 4:
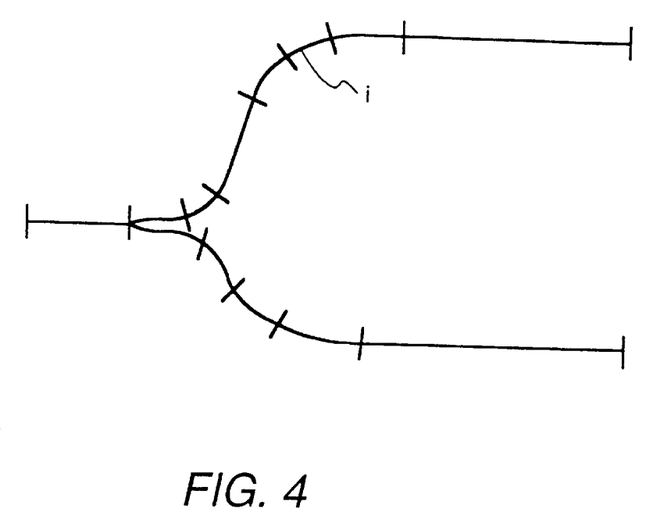
FIG. 4 is a schematic diagram showing a portion of a segmented railway track data base.

FIG. 4 schematically shows a track database where representations of the railway tracks are broken into distinct curve segments. Any particular track segment i can be accurately described by three low order one dimensional equations valid over that segment, as in $$x=f_i(p),\ y=g_i(p),\ z=h_i(p) \qquad (2)$$

where p is the single parameter that effectively specifies a point along the track segment curve through space, and the subscript identifies the track segment. As discussed in co-pending application Ser. No. 08/456,229, a pair of arrival time measurements from two GPS signals determines a hyperbolic sheet in three dimensional space, and the intersection of this surface with the railcar track segment curve yields the railcar location. The hyperbolic sheet defined by two arrival time measurements can be expressed by the function $$r(x,y,z)=0. \qquad (3)$$

The railway track database constraint is invoked by substituting equation (2) into equation (3). This yields $$r(f(p),g(p),h(p))=0, \qquad (4)$$

from which the solution, p, can be found using known programming methods. This value of parameter p is then used in equation (2) to determine the railcar x, y, and z positions. The actual form of equation (4) and its construction at the central station from the arrive time measurements at the railcar, is described in co-pending application Ser. No. 08/456,229.

Figure 5:
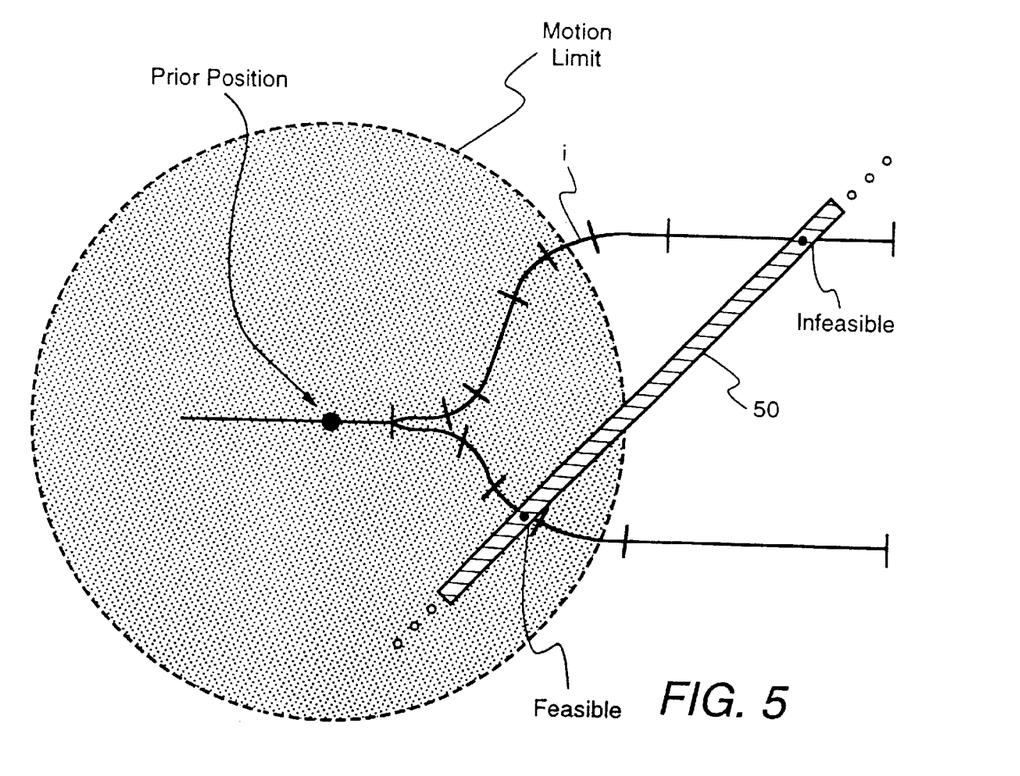
FIG. 5 is a schematic diagram similar to FIG. 4 illustrating the intersection of a measurement induced hyperbolic sheet and railway tracks under a railcar movement constraint.

If only one railway track can possibly intersect with the measurement induced hyperbolic sheet, then the number of GPS satellite signals needed is reduced from four to only two by using this invention with, for example, the second positioning method of co-pending application Ser. No. 08/456,229. In some cases, multiple railway tracks intersect the measurement induced hyperbolic sheet, resulting in an ambiguous solution. In such cases, it may be impossible for the tracked railcar to move from its prior position on one track segment to several of the possible solutions on other track segments in the time that has elapsed since the last position fix was made. Thus, railcar speed limitations and track connectivity can reduce the ambiguity. The hyperbolic sheet 50 and track intersection, as well as the railcar movement constraint, is illustrated in FIG. 5.

When railway track density is high enough, there are multiple intersections with the hyperbolic sheet induced by the arrival time measurements from just two GPS signals. In such cases, arrival time measurements from three GPS signals may be used to eliminate the ambiguity. Three arrival time measurements yield two intersecting hyperbolic sheets that describe a curve through space. The railcar must lie both on this curve and on a railway track segment. There will usually be only one possible solution. The two hyperbolic sheets induced by the three arrival time measurements are specified by $$r_1(x,y,z)=0 \text{ and } r_2(x,y,z)=0. \tag{5}$$

Combining equation (5) with equation (2) yields $$r_1(f_i(p),g_i(p),h_i(p))=0 \text{ and } r_2(f_i(p),g_i(p),h_i(p))=0. \tag{6}$$

Usually only one track segment will intersect both sheets, so there will be only one value of i and one value of p satisfying equation (6). If only two satellite signals were receivable when the railcar receiver made its measurements, then several candidate railcar locations may be determined at the central station.

A variety of methods for solving equation (4) or (6) are known to those skilled in the art. However, for a large track database, the problem can be very complex. One way to reduce the complexity of determining the railcar location is to assume a location that moves along track segments (as a railcar would move) while checking for the solution of equations (4) or (6). The prior known railcar location is used as the starting point, and all possible motions along the railway system are considered. This method uses the connectivity of the track system to constrain the search for the solution point.

It is advantageous to have a track database that is compact and easy to evaluate. If the functions in equation (2) are to be kept simple (e.g., low order polynomials for easy evaluation), then they specify the locus of track segment points only over a specified interval in space. Often, the a priori interval for the (x, y, z) railcar solution spans multiple track segment intervals along a given track so that the functions in equation (2) change as the programming algorithm progresses during the solution of equations (4) or (6). These function changes render use of the iterative gradient descent type solution algorithms less effective unless the solution is on the track segment being used at the current iteration. It is time consuming to attempt to solve equations (4) and (6) on every track segment in searching for the railcar position solution. Therefore, it is advantageous to reduce the list of candidate segments and then attempt to solve equation (4) or (6) for only those segments in the reduced list.

The complexity of finding the solution to equation (4) or (6) can be further reduced by associating a representative (x, y, z) point, or set of points, with each track segment. Instead of testing for a solution to equations (4) or (6) while assuming movement along all feasible track segments, only a rudimentary (and simple) test of the distance from the track segment representative point(s) to the hyperbolic sheet(s) is made, using the segment representative points. If the distance is small enough, the solution to equations (4) or (6) is sought. Otherwise, the segment is dropped from consideration and the next (e.g., adjacent) segment is tested. The representative points could specify bounds that define a region within which the segment lies. Alternatively, the segment end points could be used as representative points. In yet another alternative, the bounds can be replaced by a simple center of mass (centroid) for the track segment. The track segmentation can be chosen so as to make the segment representative points (bounds, end points, centroid, etc.) most useful in the testing process. The track database segmentation is done only once unless the database is changed.

To test the distance between a segment's representative point(s) and a hyperbolic sheet, the sheet can be represented by a set of points whose interpolation approximates the sheet. With two intersecting hyperbolic sheets, the curve of intersection can be represented by a (smaller) set of points whose interpolation approximates the curve. The distance between each of these points and the representative points for each segment is then tested and those pairs yielding small distances are kept for further processing. Various methods to determine a useful set of sheet or curve representation points are known to those skilled in the art. One method that can be used with two intersecting sheets (curve) is to solve for the point that is on both sheets and that is at or near an altitude of, for example, 1000 feet above sea level. Then find other points on the intersection curve nearby that are constrained to within reasonable altitude limits. The point spacing can be chosen to be commensurate with, for example, the typical track segment box sizes.

Figure 6:
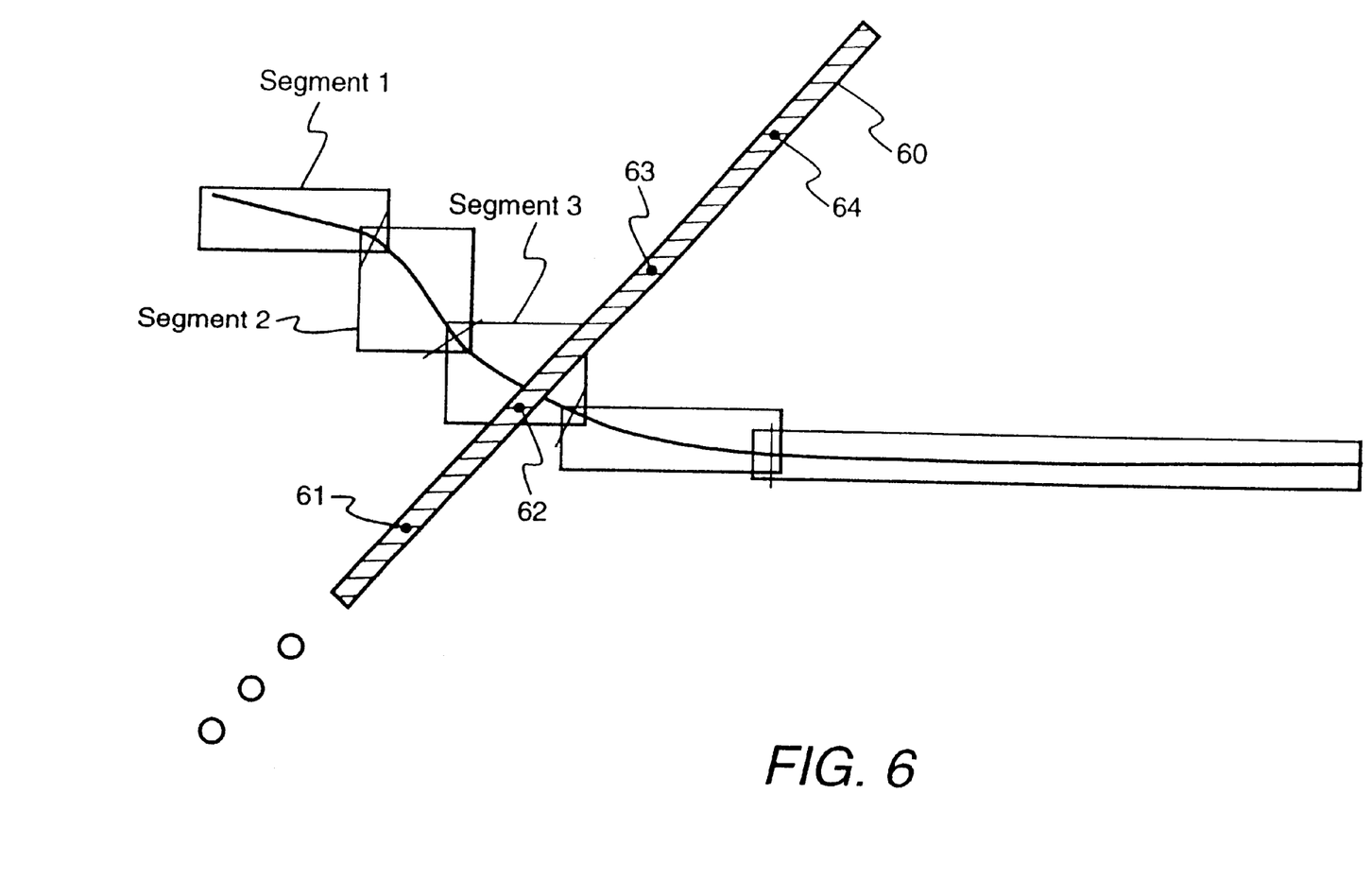
FIG. 6 is a schematic diagram showing track segmentation with bounding boxes for testing distance to hyperbolic sheet representation points.

FIG. 6 shows an example segmentation of the track set based on using a bounding box to represent each segment during the simple distance test. FIG. 6 also shows some of the representative points 61–64 on one of the measurement induced hyperbolic sheets 60. In this example, the test consists of determining if the hyperbolic sheet representative point is inside the candidate segment's bounding box. This is true if the sheet point x value is between the bounding box x limits, while the sheet point y value is between the bounding box y limits, and while the sheet point z value is between the bounding box z limits. In FIG. 6, the selected sheet point is only within the bounding box for segment 3. Thus, for this sheet point, the solution to equation (4) would be attempted only for segment 3.

The idea of using representative points for the track segments and/or measurement induced curves or surfaces can be made hierarchical to reduce the number of distance calculations needed. For example, a sequence of track segments along a track (a macro segment) can be represented by a single bounding box (or macro centroid) for the distance testing purpose. Only those macro segments with sufficiently small distance results are kept for further consideration. For such a macro segment, the segments comprising the macro segment are then similarly tested. This hierarchy can be extended to multiple levels. Furthermore, the same hierarchical concept can be applied to the representation of the measurement induced surface or curve by a set of points. Nearby representation points on the sheet are grouped into a bounding box for that point set. Then the sheet point set bounding box is tested against the macro bounding boxes for the track segments to see if they intersect. If they intersect, all track segments from the macro bounding box are tested against all representative points in the sheet bounding box.

Figure 7:
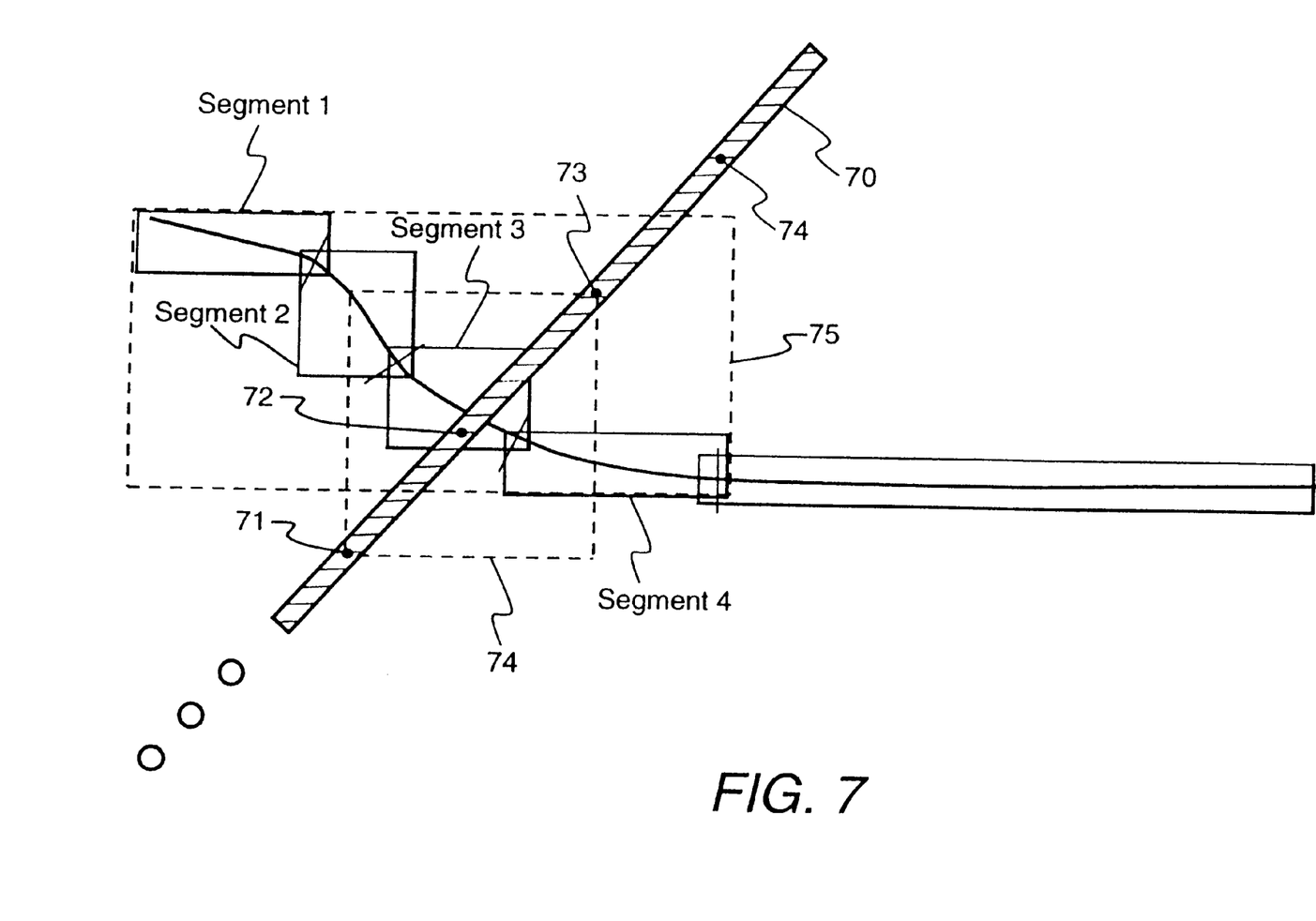
FIG. 7 is a schematic diagram similar to FIG. 6 showing a hierarchical track segment and hyperbolic sheet representation for rapid distance testing purposes.

FIG. 7 shows this level of hierarchy for both the sheet representative points, and for the track segments. In FIG. 7, sheet points 71, 72 and 73 on hyperbolic sheet 70 are all represented by a bounding box 74. Furthermore, track segments 1, 2, 3, and 4 are all included in a single macro bounding box whose bounds span all included track segment bounding boxes. In this case, the sheet bounding box 74 intersects the track segment macro bounding box 75, so that sheet points 71, 72 and 73 will be tested against each of the bounding boxes for track segments 1, 2, 3, and 4. If track bounding box 75 is the only one to intersect with sheet bounding box 74, then all other track segments in the track data base are eliminated from further testing against sheet representative points 71, 72 or 73. An efficient search is constructed using multiple levels of sheet or track-representation hierarchy.

Figure 8:
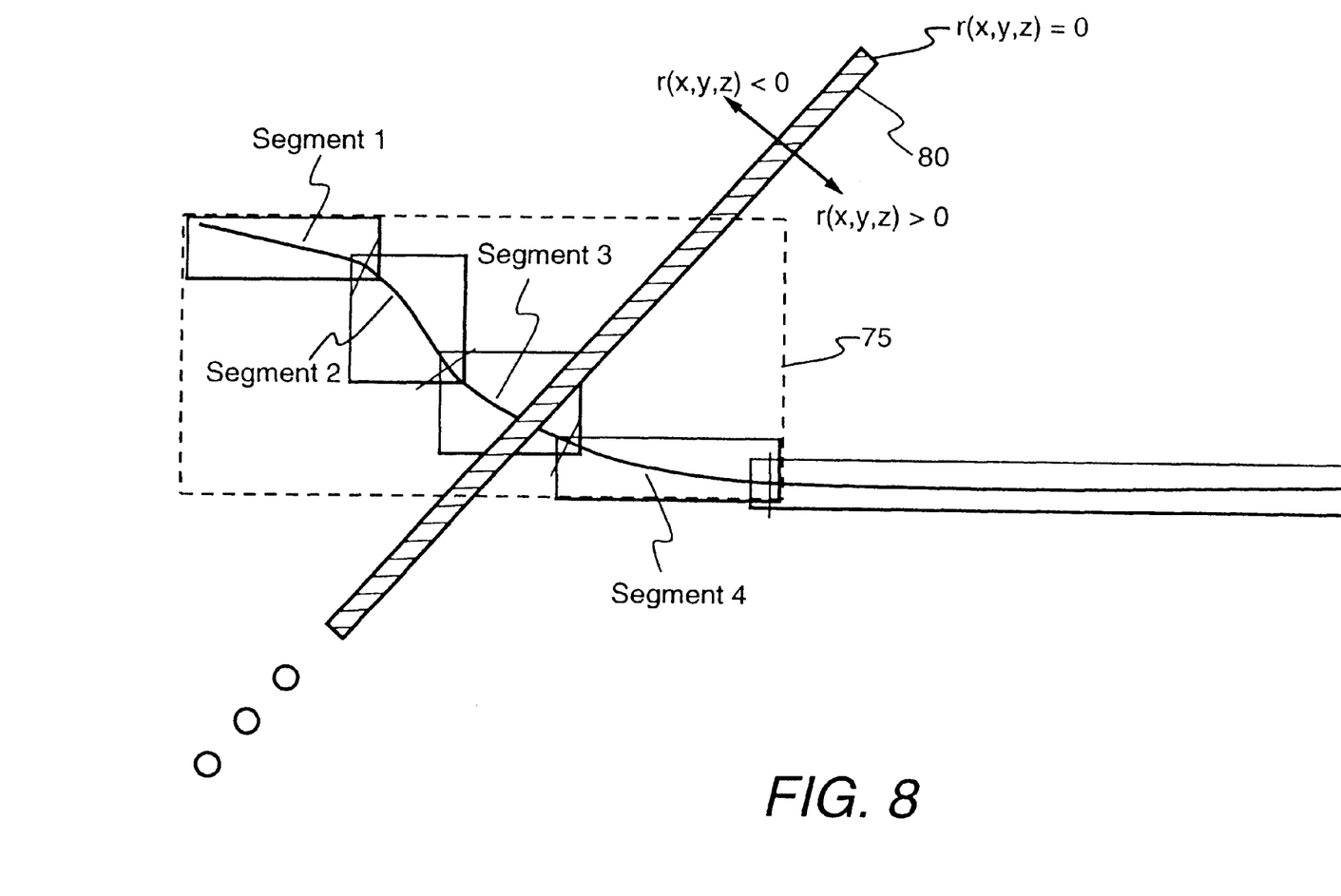
FIG. 8 is a schematic diagram similar to FIGS. 6 and 7 showing track segment localization using a hierarchical bounding box track segment representation with measurement function sign evaluations.

FIG. 8 shows yet another search method that uses a hierarchy of track segment end-points or bounding boxes to rapidly determine the railcar location. It is again desired to find the intersection of tracks in the track data base with the measurement induced hyperbolic sheet 80. The hyperbolic sheet is the solution set for equation (3), and the function in equation (3) is evaluated at the end points of each candidate track segment. If the candidate track segment crosses the hyperbolic sheet only once, then the function evaluation will yield different signs at the candidate-segment end-points. In this instance, the segment would be kept for further testing. The segment could also be kept for further testing if the evaluation at either endpoint yields a sufficiently small value. This would allow for some curvature of the track that might have both end-points on one side of the hyperbolic sheet even though the sheet actually crosses the track segment (e.g., an even number of times). Otherwise, the candidate track segment would be dropped from further testing. When a track segment is kept for further processing, the process is repeated at the next level of the hierarchy for the associated component track segments.

The hierarchical process associated with FIG. 8 can also be used when multiple measurements have generated multiple constraining hyperbolic sheets, as with equation (5). In this instance, the functions associated with each sheet are evaluated at the end-points of each candidate track segment. The track segment is kept for further consideration only if it is found to be close to all sheets. As in the single sheet example, a track segment is considered close to a sheet if the sign of the function value for that sheet is different at the two track end-points, or if the value at one end is sufficiently small.

The track database can be used, in a manner similar to that described above, to improve the localization accuracy of the methods described in co-pending application Ser. No. 08/456,229 or the standard GPS method. With any of these methods, the track search starts from the initial solution determined from the given method. The search effectively looks for the track location that is closest to the initial solution, and uses the segment bounding box and hierarchical methods described above. The initial and final solutions can be combined in a weighted manner, with weights depending on the track database accuracy. If the track database is considered perfect, then the final solution (result of the search) would be used exclusively.

The assumption has been made that track database 35 (FIG. 3) is a commercially available track database. Since these databases exist, it is convenient to use them. However, it is possible to generate the track database by tracking one or more railcars and deriving the track database from the set of position results obtained over time. More practically, an existing track database can be updated and made more accurate using the technique of tracking one or more railcars and correcting errors in the existing track database. In this way, the assumption that the track database is perfect can be justified.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A method for identifying a location of an object to be tracked comprising the steps of:

measuring at said object to be tracked data related to propagation time differences between signals transmitted from a plurality of satellites and received at said object to be tracked;

transmitting said data by said object to be tracked to a central station; and calculating at said central station the location of said object to be tracked based upon the transmitted data, a predetermined database containing information constraining the location of the object to be tracked, and data derived from at least one receiver apart from said object to be tracked receiving said signals from said plurality of satellites.

2. The method of claim 1 wherein said satellites transmit respective identification data, said object to be tracked further transmitting received satellite identification data with said data related to propagation time differences to said central station and the step of calculating the location of said object to be tracked is further based upon the satellite identification data.

3. The method of claim 2 wherein said plurality of satellites comprises at least two global positioning system (GPS) satellites and said data related to propagation time differences comprises code word phase measurements simultaneously derived from the signals transmitted from said plurality of GPS satellites and received at the object to be tracked.

4. The method of claim 2 wherein said plurality of satellites comprises at least two global positioning system (GPS) satellites and said data related to propagation time differences comprises bit phase measurements simultaneously derived from the signals transmitted from said plurality of GPS satellites and received at the object to be tracked.

5. The method of claim 1 wherein the step of calculating the location of said object comprises calculating a point of intersection of curves defined by said arrival time measurements and by said predetermined database.

6. The method of claim 5 wherein said object to be tracked is a railcar constrained to rail tracks, and the database is a track database indicating known feasible railcar location.

7. The method of claim 6 including the steps of:

assuming a railcar location that moves along the tracks; and using the tracks connectivity to constrain the railcar location to points along the tracks.

8. The method of claim 6 including the steps of:

assuming a railcar speed limitation; and using the speed limitation to constrain the railcar location.

9. The method of claim 6 wherein the track database comprises a set of track segments.

10. The method of claim 9 wherein each track segment is associated with one or more representative points for testing proximity to the measurement induced curve.

11. The method of claim 10 further comprising the steps of:

testing a distance between said representative segment points and said representative curve points; and keeping only those segments and curve points with small distances for further processing.

12. The method of claim 10 wherein the representative segment points specify coordinate bounds on the segment.

13. The method of claim 12 further comprising the steps of:

testing coordinate differences between representative segment and curve points; and keeping only those segments and curve points with small coordinate differences for further processing.

14. The method of claim 10 wherein the track database is hierarchically represented.

15. The method of claim 10 wherein the measurement induced curve is evaluated at the track segment representative points to determine proximity of said representative points to the measurement induced curve.

16. The method of claim 15 wherein the representative segment points specify coordinate bounds on the segment.

17. The method of claim 9 wherein the representative segment points comprise segment end points.

18. The method of claim 17 including the step of further testing the segment when the evaluation of the measurement induced curve function yields different signs at the segment end points.

19. The method of claim 5 further comprising the step of compiling the track database by tracking one or more railcars and deriving the track database from a set of position results obtained over time.

20. The method of claim 5 further comprising the step of updating the track database by tracking one or more railcars and deriving the track database from a set of position results obtained over time.

21. A system for identifying location of an object to be tracked comprising:

first means situated at the object to be tracked for measuring data related to propagation time differences between signals transmitted from a plurality of satellites and for receiving each of said signals identifying an associated satellite;

a central station;

second means situated at the object to be tracked for transmitting said data related to propagation time differences along with associated satellite identification data to a central station;

at least one GPS receiver situated apart from the tracked object for receiving said signals from said plurality of satellites;

a database at said central station containing information constraining the location of the object to be tracked; and means at said central station for calculating the location of said object to be tracked based upon the transmitted data, the information in said database, and data derived from said at least one GPS receiver.

22. The system of claim 21 wherein said object to be tracked comprises a railcar constrained to travel on railway tracks, and the database comprises a track database indicating known feasible railcar locations.

23. The system of claim 22 wherein the track database is divided into a set of track segments, each of said track segments being associated with at least one representative point for testing proximity to a measurement induced curve or surface.

24. The system of claim 23 wherein the measurement induced curve is hierarchically represented.

25. The system of claim 23 wherein the representative segment points specify coordinate bounds on the segment.

26. The system of claim 22 wherein said plurality of satellites comprises at least two global positioning system (GPS) satellites and said data related to propagation time differences comprises code word phase measurements simultaneously derived from the signals transmitted from said plurality of GPS satellites and received at the object to be tracked.

27. The system of claim 22 wherein said plurality of satellites comprises at least two global positioning system (GPS) satellites and said data related to propagation time differences comprises bit phase measurements simultaneously derived from the signals transmitted from said plurality of GPS satellites and received at the object to be tracked.

* * * * *